Nov. 20, 1951   G. A. HIGHBERG   2,575,662
MACHINE POWERED CHUCK
Filed Nov. 19, 1949   2 SHEETS—SHEET 1
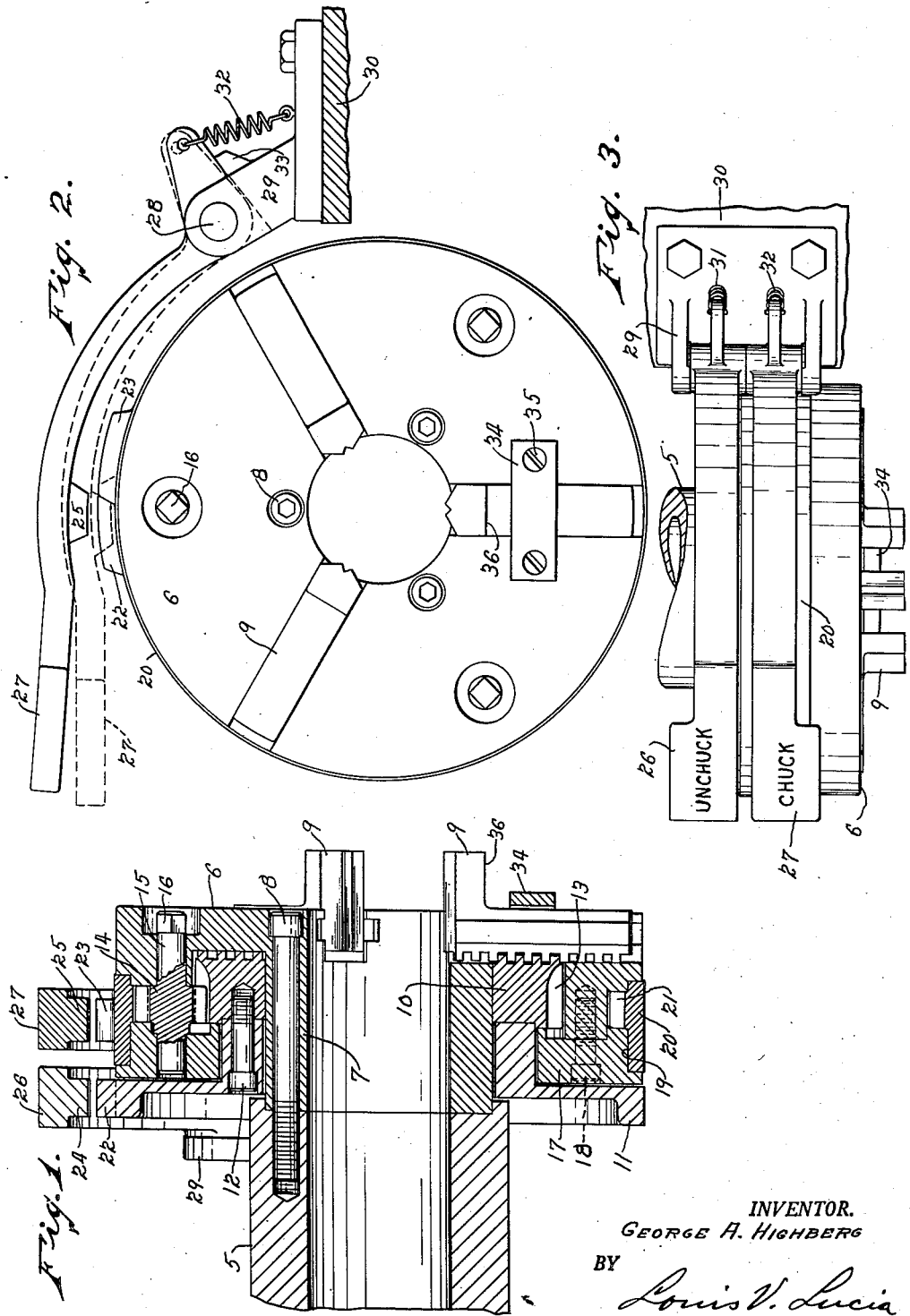
INVENTOR.
GEORGE A. HIGHBERG
BY
Louis V. Lucia
ATTORNEY.

Nov. 20, 1951 G. A. HIGHBERG 2,575,662
MACHINE POWERED CHUCK
Filed Nov. 19, 1949 2 SHEETS—SHEET 2
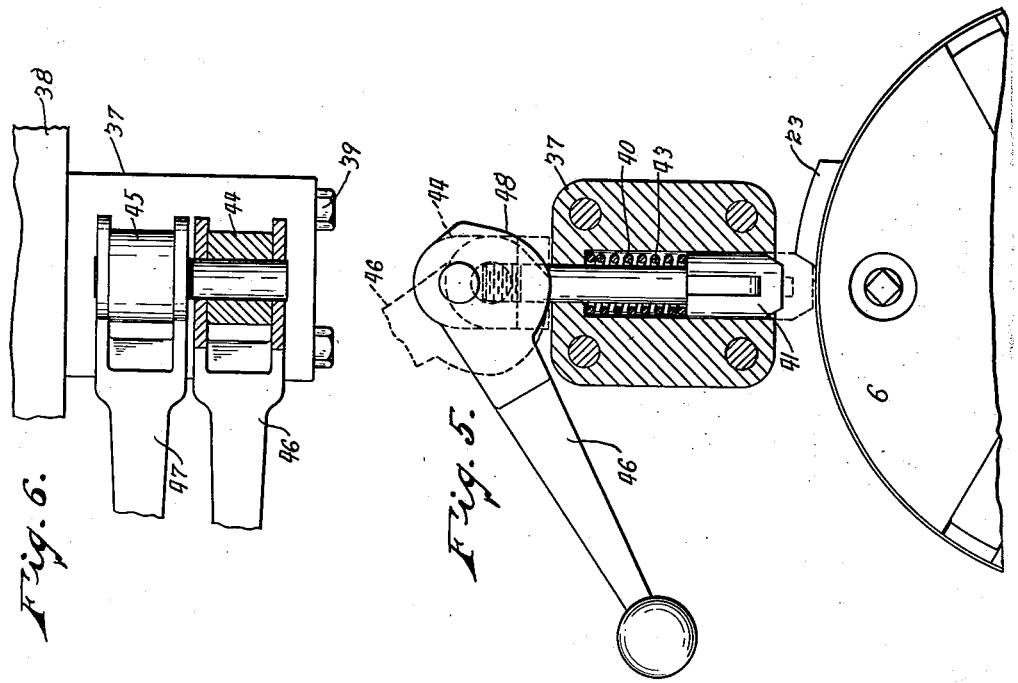
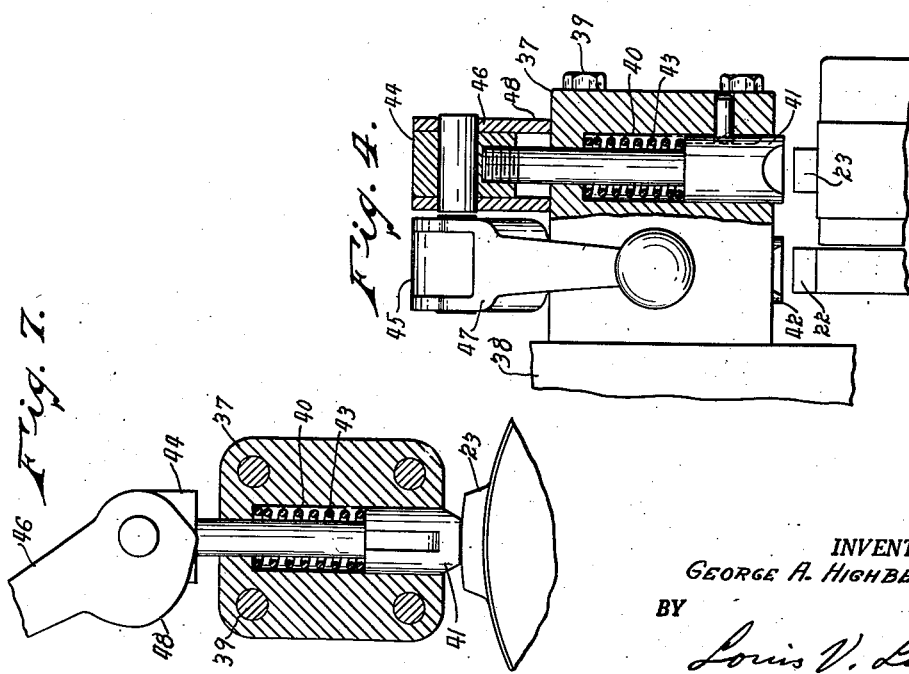
INVENTOR.
GEORGE A. HIGHBERG
BY
Louis V. Lucia
ATTORNEY.

Patented Nov. 20, 1951

2,575,662

UNITED STATES PATENT OFFICE 2,575,662

MACHINE POWERED CHUCK

George A. Highberg, West Hartford, Conn., assignor to The Whiton Machine Company, New London, Conn.

Application November 19, 1949, Serial No. 128,444

7 Claims. (Cl. 279—114)

This invention relates to a machine powered chuck and more particularly to chucks such as are operated by power from the machine in which they are mounted, for opening and closing the jaws of said chucks during the rotation thereof.

It is an object of this invention to provide such a chuck of a novel and improved construction which is easy to operate, highly efficient and durable.

Further objects and advantages of this invention will be more clearly understood from the following description and from the accompanying drawings in which:

Fig. 1 is a side view of my improved chuck, in central vertical section.

Fig. 2 is a front view of said chuck.

Fig. 3 is a plan view of said chuck on a reduced scale.

Fig. 4 is a fragmentary side view, partly in section, showing a modified form of operating mechanism.

Fig. 5 is a front view thereof, partly in section.

Fig. 6 is a fragmentary plan view showing one of the operating members partly in section.

Fig. 7 is a front view of said mechanism showing one of the levers in a different position.

In the embodiment illustrated in the drawings, the numeral 5 denotes the rotatable hollow spindle of a machine, such as a lathe or other type of turning machine, in which the work is held therein by means of a chuck.

My improved chuck comprises a body having a face portion 6 with a hub 7 that is secured to the spindle 5 by means of screws 8. A plurality of work engaging jaws 9 are slidably mounted in the face portion of the chuck and moved relatively to each other to opened and closed positions by means of a scroll plate 10 which is rotatable on the hub 7.

The said scroll plate has an operating flange 11 which is secured thereto by means of screws 12 and is disposed rearwardly of the chuck body. A series of gear teeth 13 are provided along the periphery of the scroll plate and mesh with the teeth of one or more rotating pinions 14 each having a shank 15 which is rotatable in said body and has a squared end 16 projecting therefrom so as to receive a suitable wrench when it is desired to manually rotate said pinions.

A bearing ring 17 is secured to the rear of the body, by means of screws 18, to rotatably support the opposite ends of the shanks 15. An annular groove 19 is provided in the periphery of the chuck to receive a ring gear 20 having internal teeth 21 which extend inwardly between the face portion 6 and the bearing ring 17 and mesh with the teeth of the scroll rotating pinions 14.

The flange 11 and the ring 20 are each provided with a radially extending lug 22 and 23, respectively, which engage lugs 24 and 25, respectively, on operating levers 26 and 27 that are pivotally mounted, as at 28, on a bracket 29 which is secured to a suitable stationary portion of the machine such as indicated at 30. Springs 31 and 32 are provided for the levers 26 and 27, respectively, to yieldingly retain the said operating levers in their normal inoperative position against a suitable stop 33.

In order to stop the chuck jaws in their opening movement and thereby prevent the said jaws from becoming disengaged from the scroll plate 10, I provide a stop plate 34 which is secured by screws 35, to the face of the chuck to thereby engage an abutment, such as the wall 36 on one of the jaws and prevent further opening movement of the jaws towards the open position.

The operation of my improved chuck is as follows:

When it is desired to close the jaws 9 during the rotation of the chuck by the machine, the lever 27 is forced downwardly to the position indicated in dotted lines in Fig. 2. This causes engagement between the lug 25 on said lever and the lug 23 on the ring gear 20 to thereby stop the rotation of the said ring gear and cause rotation of the pinions 14. The said pinions then rotate the scroll plate 10 and slide the jaws 9 inwardly into closed position on the face 6.

When it is desired to open said jaws, the lever 26 is pressed downwardly, causing engagement between the lugs 24 and 22. This will stop the rotation of the flange 11 and the scroll plate 10 and, through the rotation of the chuck body thereby move the jaws outwardly into open position.

When it is desired to manually operate the jaws, either into open or closed position, the scroll plate 10 may be rotated by applying a wrench to the square end 16 and rotating one of the operating pinions.

It will be noted that the lugs 22 to 25 have tapered sides so as to prevent positive locking action between the lugs on the levers and those on the chuck which could cause possible damage to the operating levers 26 and 27 in cases where excessive power is used in rotating the chuck. These tapered sides will permit the lugs to become disengaged immediately upon the levers being released, or upon the jaws reaching a fully open or closed position, and thereby prevent interference with the continued rotation of the chuck.

In the event that an operator retains the operating lever 26 downwardly when the jaws have reached their fully opened position, engagement with the stop plate 34 will force the chuck to rotate and thereby cause the lugs 24 and 22 to be thrown out of engagement by means of the inclined sides on said lugs, and permit rotation of the chuck. If the lever 27 is held downwardly when the jaws reach their fully closed position, the chuck will also be forced to rotate and thereby cause similar disengagement of the lugs 23 and 25.

In the modified form of operating mechanism illustrated in Figs. 4 to 7, I provide a mounting block 37 which is preferably secured to the spindle housing of the machine, indicated at 38, by means of the bolts 39. This block is provided with a pair of recesses 40 which open downwardly and contain plungers 41 and 42 respectively that are slidable in said recesses and forced downwardly by means of springs 43 into engagement with the lugs 22 and 23 on the chuck. The plungers 41 and 42 each have a shank which projects upwardly through a reduced opening in the block 37 and carries supports 44 and 45 to which are secured operating levers 46 and 47. These levers are each provided with cam portions 48 which engage the top of the block 37 and force the respective plunger upwardly against the tension of the spring 43, when the lever is pulled downwardly to the position illustrated in Fig. 5, and thereby disengages the plunger from its respective lug on the chuck.

With this modified form of operating mechanism, when it is desired to open or close the jaws of the chuck, the proper operating lever is merely thrown upwardly to release its respective plunger and permit it to move downwardly, under tension of its spring 43, into engagement with the lug on the chuck. When the chuck is forced into rotation, through neglect of the operator, the said plunger will merely be forced upwardly against the tension of the spring and will overpass the lug on the chuck, as shown in Fig. 7, without causing damage.

I claim:

1. A chuck comprising a body, a plurality of jaws moveable on said body, a scroll plate for moving said jaws to open and closed positions, a flange secured to said scroll plate and having an abutment portion thereon, and a stationary abutment engageable with said abutment on the flange during rotation of the chuck to stop the rotation of the scroll plate with the chuck and cause movement of the jaws.

2. A chuck as set forth in claim 1, wherein the engaging surfaces of said abutments are angled to provide cam portions for causing disengagement of said abutments upon excessive force being applied therebetween to thereby permit rotation of the chuck when a predetermined limit of movement of said chuck relatively to the abutments thereon has been reached.

3. A chuck comprising a body, a plurality of jaws moveable on said body, a hub on said body, a scroll plate rotatable on said hub and engageable with said jaws for moving them into open and closed positions upon rotation of the plate relatively to the body, a pinion rotatable in said body in engagement with teeth on said scroll plate for rotating said plate, a ring gear on said body for rotating said pinion, a lug projecting from said ring gear, a flange directly connected to said scroll plate, a lug projecting from said flange, a lever pivotally mounted independently of said chuck and having a lug thereon adapted to engage the lug on the said ring gear, and a separate lever similarly mounted and having a lug adapted to engage the lug on the flange; the said levers being separately operable during the rotation of the chuck to stop the rotation of the said ring gear with the chuck and thereby provide rotation of the scroll plate relatively to the body to move the jaws to one of said positions, or to stop rotation of the flange to thereby stop the rotation of the scroll plate with the chuck body and thereby provide relative rotation therebetween for moving the jaws to the other of said positions.

4. A chuck comprising a body, a plurality of jaws radially movable on said body, a scroll plate rotatable for moving said jaws to open and closed positions, means including an abutment normally rotatable with said chuck, mechanism operable upon the relative movement of said abutment and the chuck for causing rotation of said scroll plate, a manually movable fixed abutment operable to engage said first abutment and prevent rotation thereof with the chuck to cause relative movement therebetween and operation of the scroll plate, and means on said chuck providing a stop for limiting the opening movement of said jaws; the said abutments having angled cooperating surfaces to cause disengagement of said abutments by the rotation of the chuck upon the engagement of said jaws with the said stop means.

5. For a machine, a chuck comprising in combination a body, a plurality of jaws movable on said body, a scroll plate having a series of gear teeth thereon and rotatable in and with said body for moving said jaws to open and closed positions, a lug on said scroll plate, a pinion rotatable in said body and engageable with said gear teeth, a ring gear rotatable on said body and having teeth engageable with the teeth of said pinion, a lug on said ring gear, fixed abutment mechanism including a pair of levers pivotally mounted independently of the chuck and on a stationary portion of the machine, a separate abutment operable by each of said levers; one of the said levers being separately operable during rotation of the chuck to cause engagement of its respective abutment with the lug on the scroll plate to thereby stop the scroll plate and cause movement of the jaws in one direction, and the other of said levers being separately operable to cause engagement of its respective abutment with the lug on the ring gear to thereby stop rotation of the ring gear and, through the said pinion, cause the said scroll plate to rotate faster than the said chuck body to thereby cause movement of the jaws in the opposite direction.

6. A chuck as set forth in claim 5 wherein the fixed abutment mechanism includes a block adapted to be mounted to a stationary portion of the machine and having a pair of downwardly open recesses therein, a plunger slidable in each of said recesses, a stem on each of said plungers extending upwardly through the wall of the recess to a position above the top of the block, a lever pivotally mounted to each of said stems, spring means for urging said plungers downwardly in the block, and means associated with each of said levers for retaining the plungers in the block against the tension of said spring means; the said levers being separately operable to move its respective plunger downwardly into engagement with the abutments on the scroll plate or ring gear.

7. A chuck as set forth in claim 5 wherein the first abutment means includes a block adapted to be mounted to the stationary portion of the machine, a pair of plungers slidable in said block; one of said plungers being in register with the lug on the scroll plate and the other of said plungers being in register with the lug on the ring gear, spring means for urging each of said plungers projecting upwardly through the block to a position above the top thereof, a supporting member fastened to each of said stems, a lever pivotally mounted to each of said supporting members, and cam means on said levers engageable with the top of the block for retaining the plungers in retracted position; the said levers being separately operable to move its respective plunger downwardly into engagement with its respective lug.

GEORGE A. HIGHBERG.

REFERENCES CITED

The following references are of record in the file of this patent:

UNITED STATES PATENTS

| Number | Name | Date |
|---|---|---|
| 1,473,464 | Church | Nov. 6, 1923 |
| 1,608,462 | Cutler | Nov. 23, 1926 |
| 1,608,463 | Cutler | Nov. 23, 1926 |
| 1,608,464 | Cutler | Nov. 23, 1926 |
| 1,713,799 | Wheaton | May 21, 1929 |
| 1,807,385 | Church | May 26, 1931 |